: 3,778,353
REMOVING A CELL CULTURE FROM A CARRIER

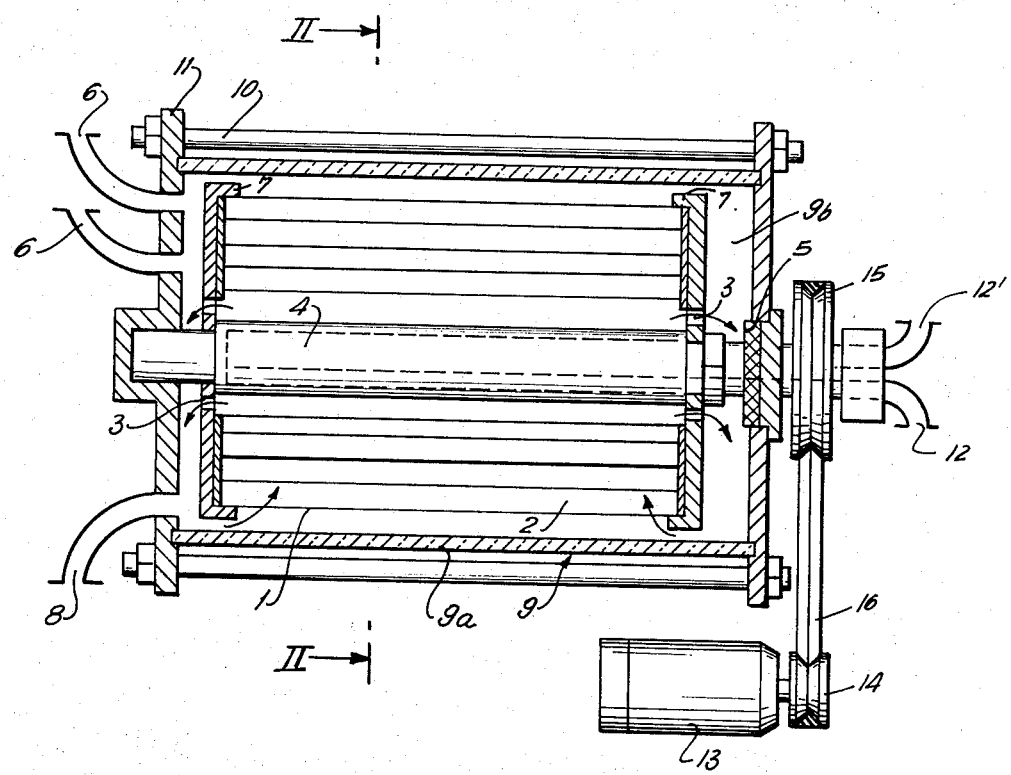
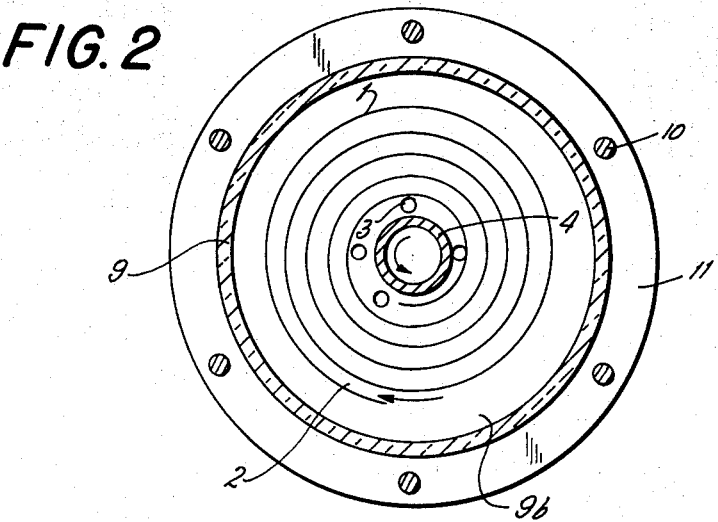

Hans Muller, Im Allmendli, Erlenbach,
Zurich, Switzerland
Continuation-in-part of application Ser. No. 274,063,
July 21, 1972. This application Mar. 6, 1973, Ser.
No. 338,509
Claims priority, application Switzerland, Aug. 13, 1971,
11,986/71; Apr. 6, 1972, 5,095/72; Apr. 28, 1972,
6,457/72
Int. Cl. C12b 1/00
U.S. Cl. 195—105                              5 Claims

ABSTRACT OF THE DISCLOSURE

A method of removing a cell culture from the surfaces of a spiral culture carrier located in a chamber is disclosed, according to which a slurry containing granular particles is admitted into the chamber so as to surround the spiral carrier, whereupon the spiral carrier is rotated in the slurry so as to obtain separation of the cell culture from the carrier due to frictional retardation of the cell culture.

CROSS-REFERENCE TO RELATED APPLICATION

A related application, of which the present application is a continuation-in-part, was filed in my name on July 21, 1972 and is co-pending under Ser. No. 274,063.

BACKGROUND OF THE INVENTION

The present invention relates to the growing of cultures, and more particularly to the growing of cultures such as tissue cells, microorganisms and the like. Still more particularly the invention relates to the method of removing culture from the surfaces of a culture carrier on which the culture has been grown.

There are many instances where cultures of tissue cells, microorganisms or the like must be grown. Particularly in the culturing of tissue cells, especially those needed for producing vaccines, it is necessary to produce diploid cells which are isolated from a tissue; experience has shown that such diploid cells must be allowed to grow only on a rigid carrier in a one-celled layer, a so-called "monolayer."

For purposes of laboratory-scale culturation these requirements can be met using glass containers, particularly Roux' flask, where the carrier is the flat bottom of the flask on which the culture is grown. If, however, it is necessary to carry out the culturation on a larger scale, for instance in order to produce vaccines, then evidently the surfaces of the carrier on which the cultures are made to grow must be as large as possible in order to obtain maximum yield. In addition, the growth conditions must be uniform everywhere on the carrier, and the same is true of the aeration, the composition of the nutrient substrate, the temperature and other parameters. As an example, when it is desired to produce anti-virus vaccines, a monolayer cell culture is first grown and is then inoculated with a liquid containing the virus. The virus then proceeds to infect the cells of the culture, whereupon the cell walls are digested by the addition of trypsin and the virus-infected cell content is then harvested. In similar manner yeasts, various bacteria, algae, fungi (for instance for the purpose of producing antibiotics and enzymes) and the like can also be produced on such planar carrier surfaces.

It has been proposed in the prior art to use horizontal plates as carriers where the production of larger quantities of biologically effective substances is required. A later approach has been to use vertical disks which are made to rotate slowly about a horizontal axis and to dip a part of their periphery into the nutrient medium. Still another proposal utilizes cylindrical glasses which are inserted into a large wheel rotating slowly. A still more recent proposal utilizes horizontal tubes mounted between vertical disks which are rotated about a horizontal axis.

These various prior-art proposals have disadvantages known to those conversant with this field. For instance, the use of horizontal tubes makes it necessary to connect the individual tubes with one another, an arrangement which is both complicated and which makes it difficult to clean and sterilize the apparatus. If the apparatus is of the type utilizing more or less vertical plates or disks which rotate about a horizontal axis, the proper adhesion of the culture layer is not assured.

In my co-pending application I have proposed an apparatus utilizing as the culture carrier a spiral carrier member located in a chamber which can accommodate nutrient media. The carrier is axially elongated and due to its spiral configuration provides a large surface area on which the culture can grow. It rotates and, because the chamber is only partially filled, slow rotation of the carrier assures that the space between two adjacent (but not contacting) carrier convolutions will always alternately be filled with substrate liquid and with gas (mostly sterile air). This assures that the culture growth will contact both media regularly and evenly. During the inoculation and growth period the number of revolutions at which the carrier element is rotated is maintained very small in order to permit the cells the opportunity to adhere to the surface of the carrier element and to grow thereon. When the growth is completed the substrate may be withdrawn from the chamber, the virus-carrying inoculation material may be added to the chamber, and thus the virus may be grown directly on the layer of culture which grows on the spiral carrier element.

However, some cultures tend to adhere very strongly to the carrier, and in this case it has been observed that difficulties may be encountered in separating the culture from the carrier element, especially if—as is most desirable—the removal of the culture from the carrier element and the subsequent cleaning of the chamber should be carried out without having to open the apparatus. This latter requirements is, of course, intended to assure that the apparatus remains sterile at all times.

SUMMARY OF THE INVENTION

It is a general object of the present invention to provide an improved method of removing the cultures from the surface of the spiral culture carrier in question. More particularly, it is an object of the invention to provide such an improved method which permits the removal of the culture in such a manner that the culture will remain undamaged if this is desired. On the other hand, the method also seeks to provide the possibility of removing the culture rapidly and in such a manner that the carrier will be properly cleaned of the culture in a minimum period of time in circumstances where it is not necessary to protect the culture against damage.

In keeping with these objects, and with others which will become apparent hereafter, one feature of the invention resides in a method of removing a culture from the surfaces of a spiral culture carrier comprising the steps of admitting into the chamber a slurry containing granular particles so as to surround the spiral carrier, and rotating the spiral carreir in said slurry to thereby obtain separation of the culture from the spiral carrier due to frictional retardation of the culture resulting from movement of the latter through the slurry.

The novel features which are considered as characteristic for the invention are set forth in particular in the appended claims. The invention itself, however, both as to its construction and its method of operation, together with addi-

BRIEF DESCRIPTION OF THE DRAWING

FIG. 1 is a somewhat diagrammatic longitudinal section through one embodiment of an apparatus having a spiral culture carrier; and FIG. 2 is a somewhat diagrammatic section taken on line II—II of FIG. 1.

DESCRIPTION OF THE ILLUSTRATED EMBODIMENT

The drawing illustrates in its two figures an apparatus identical with that disclosed in my aforementioned copending application. It is believed that an illustration of the apparatus and a description of its operation herein is desirable in order to facilitate an understanding of the novel method according to the present invention.

With this in mind it will be seen that reference numeral 9 designates in toto a vessel having, in the illustrated embodiment, a circumferential wall 9a and two end walls 11. These walls together surround and enclose a chamber 9b. Connecting rods 10, extending from one to the other of the walls 11 as illustrated, connect the walls 11 with the wall 9a. The latter is of a material permitting the visual inspection of the interior of the chamber 9b, for instance of glass, and the walls 11 may be of various materials, for instance metallic material.

A shaft 4, here illustrated as being hollow, extends through the chamber 9b and has a substantially horizontal orientation. It is suitably journalled for rotation and has a portion extending outwardly through the right-hand wall of FIG. 1 via a stuffing box 5 which assures that the interior of the chamber 9b remains sterile and that no leakage can occur. The portion of the shaft 4 which is located outside the vessel 9 is provided with a pulley 15, and a reversible motor is also provided with a pulley, identified with reference numeral 14, for instance on its output shaft. A belt 16 connects the pulleys 14 and 15 so that the pulley 14 transmits rotary motion to the pulley 15 when the motor 13 is energized. Reversible motors are known per se, as are motors whose speed can be varied, a feature which in the apparatus described is required in order to assure that the shaft 4 can be rotated slower or faster, as may be necessary. Speed variation could of course be achieved in another way also, for instance by using variable sheaves.

Mounted on the shaft 4 for rotation therewith is a spiral carrier element on which a culture is to be grown. The element 1 is composed of a plurality of at least substantially concentric convolutions, as shown particularly in FIG. 2, which are not in engagement with one another. This means that a spiral path 2 exists between the convolutions. This path 2 has an outer inlet end at the periphery of the element 1 and an inner outlet end at or adjacent the center or core of the element 1. The opposite axial ends of the element 1, and thereby of the path 2, are closed by end plates or end walls 7 which are connected with the carrier element 1 in suitable manner. It is not necessary that an absolutely fluid-tight connection exist between the plates 7 and the carrier element 1, but such fluid-tight connection must of course exist between the wall 9a and the walls 11 of the vessel 9. For this purpose, appropriate seals known per se are utilized.

When the shaft 4 with the carrier element 1 is slowly rotated in the direction indicated by the curved arrow in FIG. 2, the liquid in the chamber 9b can enter into the path 2 in the direction of the arrow and will slowly flow through the entire spiral path 2 until it reaches the core of the spiral carrier element 1, from where it leaves through the apertures 3 which are provided for this purpose in the end plates 7, to flow back into the chamber 9b. This means that during each revolution of the spiral carrier element 1 liquid and gas will alternately pass along the path 2, in contact with the surface of the carrier element 1 so that the culture which develops and grows on the surfaces bounding this path 2 will thus alternately come in contact with both these media, that is the gas and the liquid.

Inlet and outlet connections are designated with reference numerals 12 and 12', respectively, and serve to connect the interior of the hollow shaft 4 with a source of heat-exchange fluid for heating and/or cooling purposes. Such fluid can then be circulated through the shaft 4 to provide heating or cooling as required.

Liquid and gaseous media can be admitted into the chamber 9b via the inlets 6, and contents can then be removed from chamber 9b via the outlet 8. Of course, suitable closures will be provided for the inlets 6 and outlets 8, but are not believed to require detailed discussion.

Experience has shown that the growth of cultures in monolayers is possible only on carriers whose characteristics are such as to permit adequate adhesion of the cells of the culture. The material which is conventionally used for such purposes is glass. However, it is difficult if at all possible to produce the spiral carrier element 1 from a plate or strip of glass. It is therefore proposed to produce the carrier element 1 by utilizing a plurality of axially arrayed identically configurated spirals made of glass tubes or glass rods which are in axial abutment with one another and at the point of abutment are connected by letting the materials melt and flow together. The carrier element 1 can however also be produced from metallic material, advantageously steel, in which case strip or sheet steel can be utilized. In such a case the exposed surfaces of the carrier 1 might be provided with a coating of vitreous enamel. Suitable synthetic plastic material might also be employed, polycarbonate having been found to be particularly advantageous because it is sufficiently temperature-resistant and offers the necessary adhesion for the cells.

When the culture growing on the surfaces of the carrier element 1 is to be removed, two possibilities for removal exist; the removal may either be carried out in such a manner that the culture will remain as undamaged as possible, or the culture can be removed without consideration of the consequences in terms of damage resulting from the removal. The latter approach will normally be used when it is merely necessary to clean the carrier element 1 and the apparatus per se, that is when the culture has been grown and has been inoculated and the virus or whatever organism has been harvested. If, under these circumstances, residual culture is to be removed and the apparatus is to be washed, for instance after trypsin treatment or inoculation with viruses, then the method according to the present invention proposes an approach which permits the apparatus to remain closed and yet to be properly cleaned, especially insofar as the surfaces of the spiral carrier element 1 are concerned.

Under such circumstances a particulate granular material of for instance 50–200 micron particle diameter is placed in water to form therein a slurry, for instance a quantity of between 50 and 100 particles per liter. This slurry is then admitted via the inlet the inlet 6 into the chamber so as to come in contact with the spiral carrier element 1. The latter is then rotated relatively rapidly for a period of time, for instance at speeds of up to 50 r.p.m. Residual quantities of cells, protein or the like become detached from the surfaces of the spiral carrier element 1 due to the friction resulting from the movement of the carrier element 1 with the culture thereon through the slurry of granular material. Thereupon, the contents of the apparatus are discharged and the apparatus can be flushed and sterilized without having to be opened, whereupon it is ready for the next operation. For removal of culture from the carrier element 1 in this manner, that is by relatively rapid rotation of the carrier element 1 and where no need exists to protect the culture, the particulate granular material used to produce the slurry may for instance be glass powder, quartz sand, synthetic plastic granules or possibly also coarse diatomite.

There are, however, circumstances where it is desired to detach the culture from the surfaces of the carrier element 1 without damaging the culture, or at least with a minimum of damage. This is for instance the case if it is desired to separate the cells of the culture from one another prior to inoculation with a virus, and without having to dissolve the cell walls by a trypsin treatment. In such a case the slurry is made with a particulate granular material which is as soft as possible and has as few sharp edges as possible, for instance synthetic plastic powder or granulate. As before, the suspension made of the granulate and water is admitted into the chamber. Now, however, the carrier element 1 is rotated very slowly, for instance at one or two rotations per minute, leading to a very gentle detaching of the cells of the culture from the carrier element 1. This assures that no components of the culture might be destroyed or changed which are desired to be maintained in undamaged condition, unlike the conventional treatment with trypsin where this danger always exists.

Finally, the invention has a still further advantage, namely in that the use of appropriate granular materials in the slurry admitted into contact with the surfaces of the carrier element 1, may be employed and may serve to slightly roughen the surface of the carrier element 1. In certain circumstances the growing of cultures on absolutely smooth surfaces can be very difficult, and a slightly roughened surface affords a much better adhesion for the cells or for culture in a monolayer. In this case a particulate granular material is used for the slurry to effect removal of the culture in circumstances where it is not desired to maintain the culture undamaged, and in particular such a granular material is used which has a somewhat greater hardness than the material of the surface of the spiral carrier element 1 itself. For instance, if the element 1 is of glass, then the particulate material may be Carborundum or quartz, and if the carrier element 1 is of synthetic plastic then a granulate of a plastic having a greater hardness, or an inorganic material can be employed. In removing the cell culture from the surfaces of the carrier element 1, this relatively hard granulate will also slightly abrade the surfaces of the carrier element 1, thereby making them slightly rough and providing for better adhesion of future cultures to be grown on the carrier element 1.

Under certain circumstances, and if the surface of the carrier element 1 is absolutely smooth, certain types of cultures can in fact be grown on these smooth surfaces and will adhere thereto. However, then it is as a rule possible to clean the surfaces and to remove the cultures therefrom without having to admit granulate. If, however, the surface of the element 1 has been roughened as pointed out above, then the adhesion of the culture will be stronger than if the surface were smooth, and the subsequent juice of the granular slurry for removal of the culture is essential or at least greatly facilitates the removal. Of course, it is also possible to admit a slurry into the chamber at the time the carrier element 1 is used for the first time or for the first several times, perhaps even without yet growing cultures on its surfaces, merely for the purpose of causing slight roughening and abrading of the surfaces of the element 1, for subsequent better adhesion of the culture thereto.

It will be understood that each of the elements described above, or two or more together, may also find a useful application in other types of constructions differing from the types described above.

While the invention has been illustrated and described as embodied in the growing of cultures on carrier elements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptation should and are intended to be comprehended within the meaning and range of equivalence of the following claims.

What is claimed as new and desired to be protected by Letters Patent is set forth in the appended claims:

1. A method of removing a culture from the surfaces of a spiral culture carrier which is located in a chamber, comprising the steps of admitting into said chamber a slurry containing granular particles, so as to surround said spiral carrier; and rotating said spiral carrier in said slurry to thereby obtain separation of said culture from said spiral carrier due to frictional retardation of the culture resulting from movement of the latter through said slurry.

2. A method as defined in claim 1, wherein the step of admitting said slurry comprises making an aqueous suspension of granular particles, and admitting said suspension into said chamber.

3. A method as defined in claim 1, wherein the step of admitting said slurry comprises making an aqueous suspension of granular particles having a particle size of between substantially 50 and 200 microns, and admitting said suspension into said chamber.

4. A method as defined in claim 1, wherein the step of rotating comprises imparting to said carrier a rotary speed sufficient to effect rapid separation of said culture from said carrier irrespective of damage occurring to said culture as a result of said rapid rotation.

5. A method as defined in claim 1, wherein the step of rotating comprises imparting to said carrier a rotary speed sufficient to effect slow separation of said culture from said carrier without damage occurring to said culture as a result of said rotation.

References Cited
UNITED STATES PATENTS

| | | | |
|---|---|---|---|
| 2,952,588 | 9/1960 | Rinderer | 195—143 |
| 3,732,149 | 5/1973 | Santero | 195—143 |

A. LOUIS MONACELL, Primary Examiner

R. J. WARDEN, Assistant Examiner

U.S. Cl. X.R.

195—104, 139, 142, 143, 144